(12) United States Patent
Kan et al.

(10) Patent No.: US 10,977,941 B2
(45) Date of Patent: *Apr. 13, 2021

(54) PASSENGER TRANSIT VEHICLE GEOLOCATION

(71) Applicant: GOOGLE LLC, Mountain View, CA (US)

(72) Inventors: Reuben Kan, Carlingford (AU); Cayden Meyer, Prymont (AU)

(73) Assignee: Google LLC, Mountain View, CA (US)

( * ) Notice: Subject to any disclaimer, the term of this patent is extended or adjusted under 35 U.S.C. 154(b) by 143 days.

This patent is subject to a terminal disclaimer.

(21) Appl. No.: 16/246,277

(22) Filed: Jan. 11, 2019

(65) Prior Publication Data

US 2019/0189009 A1 Jun. 20, 2019

Related U.S. Application Data

(63) Continuation of application No. 15/629,368, filed on Jun. 21, 2017, now Pat. No. 10,210,757.

(51) Int. Cl.
*G08G 1/123* (2006.01)
*G01C 21/36* (2006.01)
(Continued)

(52) U.S. Cl.
CPC ............ *G08G 1/123* (2013.01); *G01S 5/0027* (2013.01); *G06Q 20/36* (2013.01); *G06Q 50/30* (2013.01); *G08G 1/127* (2013.01); *G08G 1/202* (2013.01)

(58) Field of Classification Search
CPC ........ G08G 1/123; G06Q 10/047; G01C 21/34; G01C 21/36; H04W 24/08; H04W 36/00; G07B 15/02
See application file for complete search history.

(56) References Cited

U.S. PATENT DOCUMENTS 9,585,038 B2 * 2/2017 Al-Shalash ............ H04W 24/08
10,210,757 B2 * 2/2019 Kan ...................... G01S 5/0027
(Continued)

FOREIGN PATENT DOCUMENTS

WO 2018/236433 A1 12/2018

OTHER PUBLICATIONS

U.S. Appl. No. 15/629,368 to Reuben Kan et al., filed Jun. 21, 2017.
(Continued)

*Primary Examiner* — Yuri Kan
(74) *Attorney, Agent, or Firm* — Dority & Manning, P.A.

(57) ABSTRACT

Locating passenger transit vehicles by detecting interactions. Each interaction is between a transit terminal and a geolocation-enabled user device, and is characterized by data indicative of the interacting terminal, the interacting user device, and the time of interaction. For each detected interaction, a geolocation of the corresponding user device at the time of the interaction is requested; and in response to the requesting, the geolocation of the corresponding user device, the time of the geolocation, and the data indicative of the interacting terminal is received. A particular passenger transit vehicle associated with at least one interacting terminal is identified based on the user device geolocations. The location of the passenger transit vehicle is transmitted for display on user devices.

20 Claims, 5 Drawing Sheets

(51) Int. Cl.
*G07B 15/02* (2011.01)
*G01C 21/34* (2006.01)
*H04W 36/00* (2009.01)
*G08G 1/00* (2006.01)
*G06Q 20/36* (2012.01)
*G01S 5/00* (2006.01)
*G06Q 50/30* (2012.01)
*G08G 1/127* (2006.01)

(56) References Cited

U.S. PATENT DOCUMENTS

| | | | |
|---|---|---|---|
| 2002/0069017 A1* | 6/2002 | Schmier | G08G 1/123 |
| | | | 701/469 |
| 2008/0054072 A1* | 3/2008 | Katragadda | G08G 1/123 |
| | | | 235/384 |
| 2015/0073702 A1* | 3/2015 | Jouaux | G06Q 10/047 |
| | | | 701/465 |
| 2015/0073703 A1* | 3/2015 | Jouaux | G01C 21/34 |
| | | | 701/465 |
| 2016/0174049 A1 | 6/2016 | Levy et al. | |
| 2016/0238693 A1 | 8/2016 | Jouaux et al. | |

OTHER PUBLICATIONS

Kan "U.S. Office Action issued in copending U.S. Appl. No. 15/629,368, filed Jun. 21, 2017", dated Jun. 1, 2018, 11 pages.
Tancredi "International Search Report and Written Opinion issued in International Application No. PCT/US2018/021166", dated May 22, 2018, 13 pages.
Taylor et al., "Virtual Differential GPS & Road Reduction Filtering by Map Matching", GPS-1999, Proceedings of the 12th International Technical Meeting of Ion GPS, The Institute of Navigation, pp. 1675-1684, Sep. 17, 1999.

* cited by examiner

200

```
┌─────────────────────────────────────────────────────────────────────────┐
│ Detect each of a plurality of interactions between one of a plurality   │
│ of transit terminals and one of a plurality of geolocation-enabled      │
│ user devices                                                            │
│                                  210                                    │
└─────────────────────────────────────────────────────────────────────────┘
                                     │
                                     ▼
┌─────────────────────────────────────────────────────────────────────────┐
│ For each detected interaction, request a geolocation of the             │
│ corresponding user device at the time of the interaction                │
│                                  220                                    │
└─────────────────────────────────────────────────────────────────────────┘
                                     │
                                     ▼
┌─────────────────────────────────────────────────────────────────────────┐
│ In response to a request for geolocation, receive the geolocation of    │
│ the corresponding user device, the time of the geolocation, and the     │
│ data indicative of the interacting terminal                             │
│                                  230                                    │
└─────────────────────────────────────────────────────────────────────────┘
                                     │
                                     ▼
┌─────────────────────────────────────────────────────────────────────────┐
│ Geolocate a public transit vehicle associated with at least one         │
│ interacting terminal based on the received user device geolocations     │
│                                  240                                    │
└─────────────────────────────────────────────────────────────────────────┘
                                     │
                                     ▼
┌─────────────────────────────────────────────────────────────────────────┐
│ Transmit, for display on one or more user devices, the location of at   │
│ least one passenger transit vehicle                                     │
│                                  250                                    │
└─────────────────────────────────────────────────────────────────────────┘
```

```
┌─────────────────────────────────────────────────────────────────────┐
│ Detect each of a plurality of interactions between one of a         │
│ plurality of transit terminals and one of a plurality of            │
│ geolocation-enabled user devices                                    │
│ 210                                                                 │
└─────────────────────────────────────────────────────────────────────┘
                                    │
                                    ▼
┌─────────────────────────────────────────────────────────────────────┐
│ For each detected interaction, request a geolocation of the         │
│ corresponding user device at the time of the interaction            │
│ 220                                                                 │
└─────────────────────────────────────────────────────────────────────┘
                                    │
                                    ▼
┌─────────────────────────────────────────────────────────────────────┐
│ In response to a request for geolocation, receive the geolocation   │
│ of the corresponding user device, the time of the geolocation, and  │
│ the data indicative of the interacting terminal                     │
│ 230                                                                 │
└─────────────────────────────────────────────────────────────────────┘
                                    │
┌──────────────────────┐            ▼
│ Receiving a route    │  ┌───────────────────────────────────────────┐
│ of each of a         │  │ Assigning a geolocation of the PTV at a   │
│ plurality of         │  │ point that minimizes the distance between │
│ particular passenger │─▶│ 1) the centroid of the user device        │
│ transit vehicles     │  │ geolocation associated with an interacting│
│ 410                  │  │ TT within a predetermined time window and │
│                      │  │ 2) the route received for the PTV         │
│                      │  │ associated with the interacting terminal  │
│                      │  │ 440                                       │
└──────────────────────┘  └───────────────────────────────────────────┘
                                    │
                                    ▼
┌─────────────────────────────────────────────────────────────────────┐
│ Transmit for display on one or more user devices, the location of   │
│ at least one passenger transit vehicle                              │
│ 250                                                                 │
└─────────────────────────────────────────────────────────────────────┘
```

PASSENGER TRANSIT VEHICLE GEOLOCATION

CROSS-REFERENCE TO RELATED APPLICATION

This application is a continuation of and claims priority to U.S. patent application Ser. No. 15/629,368, filed Jun. 21, 2017, now issued as U.S. Pat. No. 10,210,757, and entitled "Passenger Transit Vehicle Geolocation." The entire contents of the above-identified priority application are hereby fully incorporated herein by reference.

TECHNICAL FIELD

The technology disclosed herein is related to geolocating passenger transit vehicles. Specific embodiments relate to geolocating public transit buses at predetermined transit stops.

BACKGROUND

Passenger transit includes both public transit (for example, public buses, subways, trains, trolleys, and airplanes) and private passenger transit (for example, taxicabs, sedan services, and chartered buses). Payment of passenger transit fares may be made in a variety of ways, including payment upon passenger embarkation using Internet-enabled user devices.

Geolocation identifies or estimates the geographic location of an object. Typically, geolocation involves the generation of a set of geographic coordinates, a street address, or landmark identification. Most smartphones on the market in the United States in 2017 are geolocation enabled, and can employ a combination of Global Positioning System (GPS), strength of cell phone carrier signal, and inertial navigation to determine the phone's geolocation.

SUMMARY

Embodiments of the technology disclosed herein include methods, systems, and computer program products, to locate passenger transit vehicles by detecting interactions between transit terminals associated with those vehicles and geolocation-enabled user devices. Each interaction is characterized by data indicative of the interacting terminal, the interacting user device, and the time of interaction. For each detected interaction, a geolocation of the corresponding user device at the time of the interaction is requested. In response to the request, the geolocation of the corresponding user device, the time of the geolocation, and the data indicative of the interacting terminal is received. A particular passenger transit vehicle associated with at least one interacting terminal is identified based on the user device geolocations. The location of the passenger transit vehicle is transmitted for display on user devices.

These and other aspects, objects, features, and advantages of the example embodiments will become apparent to those having ordinary skill in the art upon consideration of the following summary description of illustrated example embodiments.

BRIEF DESCRIPTION OF THE DRAWINGS

FIG. 2 is a block flow diagram depicting a method to geolocate passenger transit vehicles, in accordance with certain example embodiments.

FIG. 4 is block flow diagrams depicting a method to geolocate passenger transit vehicles, in accordance with certain example embodiments.

DETAILED DESCRIPTION OF THE EXAMPLE EMBODIMENTS

Overview

The location of passenger transit vehicles is of interest to transit system operators, transit system managers, potential passengers, and others. However, not all passenger transit vehicles are equipped with both the geolocation systems necessary to self-locate and the communication systems to transmit that information to the interested parties. Among those passenger transit vehicles that are so equipped, breakdowns of the geolocation and communication equipment and poor communications signal quality can compromise both geolocation and communication performance—thereby impeding the ability of the passenger transit vehicle to report on its location. In addition, equipping each passenger transit vehicle with reliable systems for geolocation and reporting increases both capital and operating expenses related to the passenger transit vehicle.

By using and relying on the methods and systems described herein, the technology disclosed herein geolocates passenger transit vehicles, in part by crowd sourcing both geolocation and reporting to user devices interacting with transit terminals on the passenger transit vehicles. As such, the technology may be employed to reduce equipment installed in the passenger transit vehicles and contribute to the reliability of the geolocation function through reducing failure modes by allocating a portion of the geolocation and reporting tasks across a plurality of user devices.

Turning now to the drawings, in which like numerals represent like (but not necessarily identical) elements throughout the figures, example embodiments are described in detail.

Example System Architectures

Figure 1:
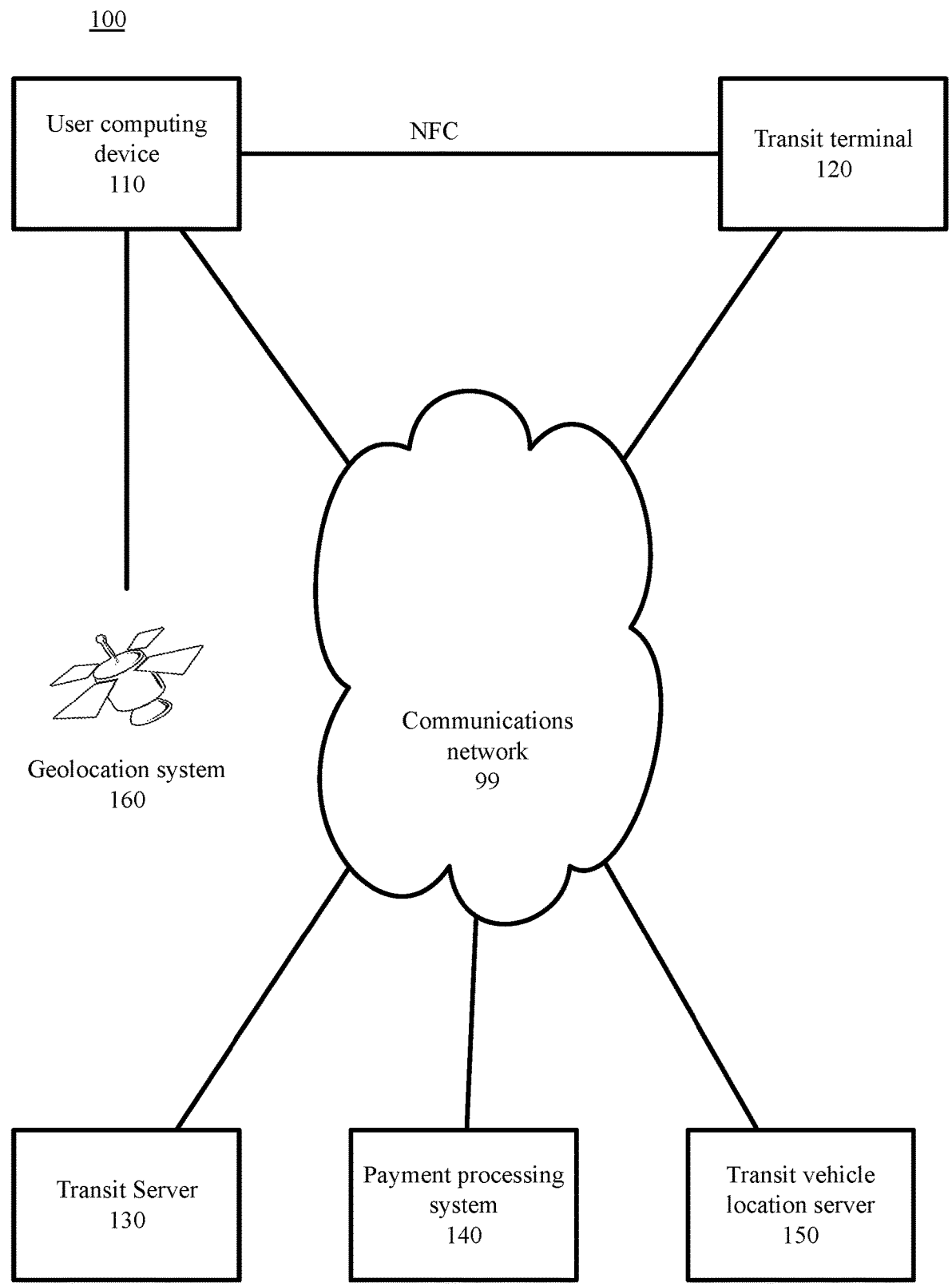
FIG. 1 is a block diagram depicting an operating environment to geolocate passenger transit vehicles, in accordance with certain example embodiments.

FIG. 1 is a block diagram depicting a communications and processing operating environment 100 to geolocate passenger transit vehicles, in accordance with certain example embodiments. While each server, system, and device shown in the architecture is represented by one instance of the server, system, or device, multiple instances of each can be used. Further, while certain aspects of operation of the present technology are presented in examples related to FIG. 1 to facilitate enablement of the claimed invention, additional features of the present technology, also facilitating enablement of the claimed invention, are disclosed elsewhere herein.

As depicted in FIG. 1, the example operating environment 100 includes network devices, user computing device(s) 110, transit terminal(s) 120, transit server 130, payment processing system 140, and transit vehicle location server 150; each of which may be configured to communicate with one another via communications network 99. The example operating environment also includes geolocation system (not shown), which can be a GPS system, a system based on cell phone carrier signal, or any other radio frequency (RF)

means for determining the geolocation of a user computing device 110. In some embodiments, a user associated with a device must install an application and/or make a feature selection to obtain the benefits of the technology described herein.

Communications network 99 includes one or more wired or wireless telecommunications means by which network devices may exchange data. For example, the communications network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network device, user computing device(s) 110, transit terminal(s) 120, transit server 130, payment processing system 140, and transit vehicle location server 150 can include a communication module capable of transmitting and receiving data over the communications network 99. For example, each network device can include a server, a desktop computer, a laptop computer, a tablet computer, a television with one or more processors embedded therein and/or coupled thereto, a smart phone, a handheld computer, a personal digital assistant (PDA), or any other wired or wireless processor-driven device. In the example architecture depicted in FIG. 1, a transit passenger may operate user computing device 110. A transit system may operate one or more transit terminals 120 and transit server 130. Transit terminals 120 can include those fixed on vehicles, such as fare terminals on buses and point-of-sales devices in taxis, and those not on vehicles, such as turnstile terminals in subways and fare terminals in accessible brick-and-mortar locations. The transit server 130 may make both scheduled and real-time transit data available on the Internet, for example, in accordance with one or more of the General Transit Feed Specification (GTFS), GTFS-realtime, Transmodel, and VDV-45X via communications network 99.

A payment processor, for example, an electronic wallet provider, may operate payment processing system 140. Any of several parties, including the public transit system, the payment processor, or a third party, may operate the public transit vehicle location server 150, which can perform some of the functions of the technology disclosed herein.

The network connections illustrated are examples and other means of establishing a communications link between the computers and devices can be used. Moreover, those having ordinary skill in the art having the benefit of the present disclosure will appreciate that the network devices illustrated in FIG. 1 may have any of several other suitable computer system configurations. For example, user computing device 110 may be embodied as a mobile phone or handheld computer and may not include all the components described above.

Figure 5:
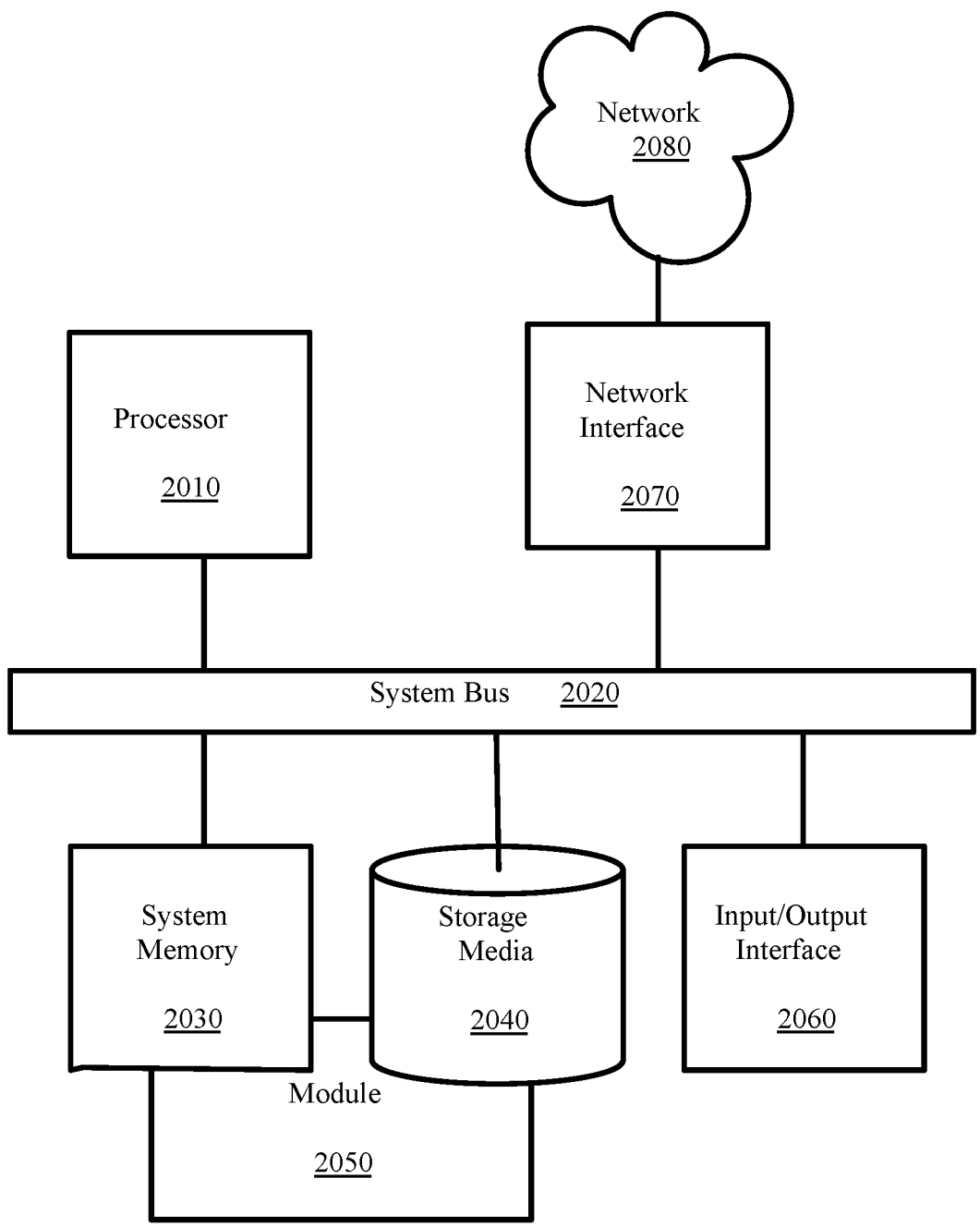
FIG. 5 is a block diagram depicting a computing machine and a module, in accordance with certain example embodiments.

In example embodiments, the network computing devices, and any other computing machines associated with the technology presented herein, may be any type of computing machine such as, but not limited to, those discussed in more detail with respect to FIG. 5. Furthermore, any modules associated with any of these computing machines, such as modules described herein or any other modules (scripts, web content, software, firmware, or hardware) associated with the technology presented herein may be any of the modules discussed in more detail with respect to FIG. 5. The computing machines discussed herein may communicate with one another as well as other computer machines or communication systems over one or more networks, such as communications network 99. The communications network 99 may include any type of data or communications network 99, including any of the network technology discussed with respect to FIG. 5.

Example Processes

The example methods illustrated in the figures are described hereinafter with respect to the components of the example operating environment 100. The example methods also can be performed with other systems and in other environments. The operations described with respect to any of the figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Referring to FIG. 2, and continuing to refer to FIG. 1 for context, a block flow diagram depicting a method 200 to geolocate passenger transit vehicles in accordance with certain example embodiments is shown.

In such a method 200, one or more computing devices detects each of a plurality of interactions between one of a plurality of transit terminals 120 and one of a plurality of geolocation-enabled user computing devices 110—Block 210. Each interaction is characterized by data indicative of the interacting transit terminal 120, the interacting user computing device 110, and the time of interaction.

Figure 3:
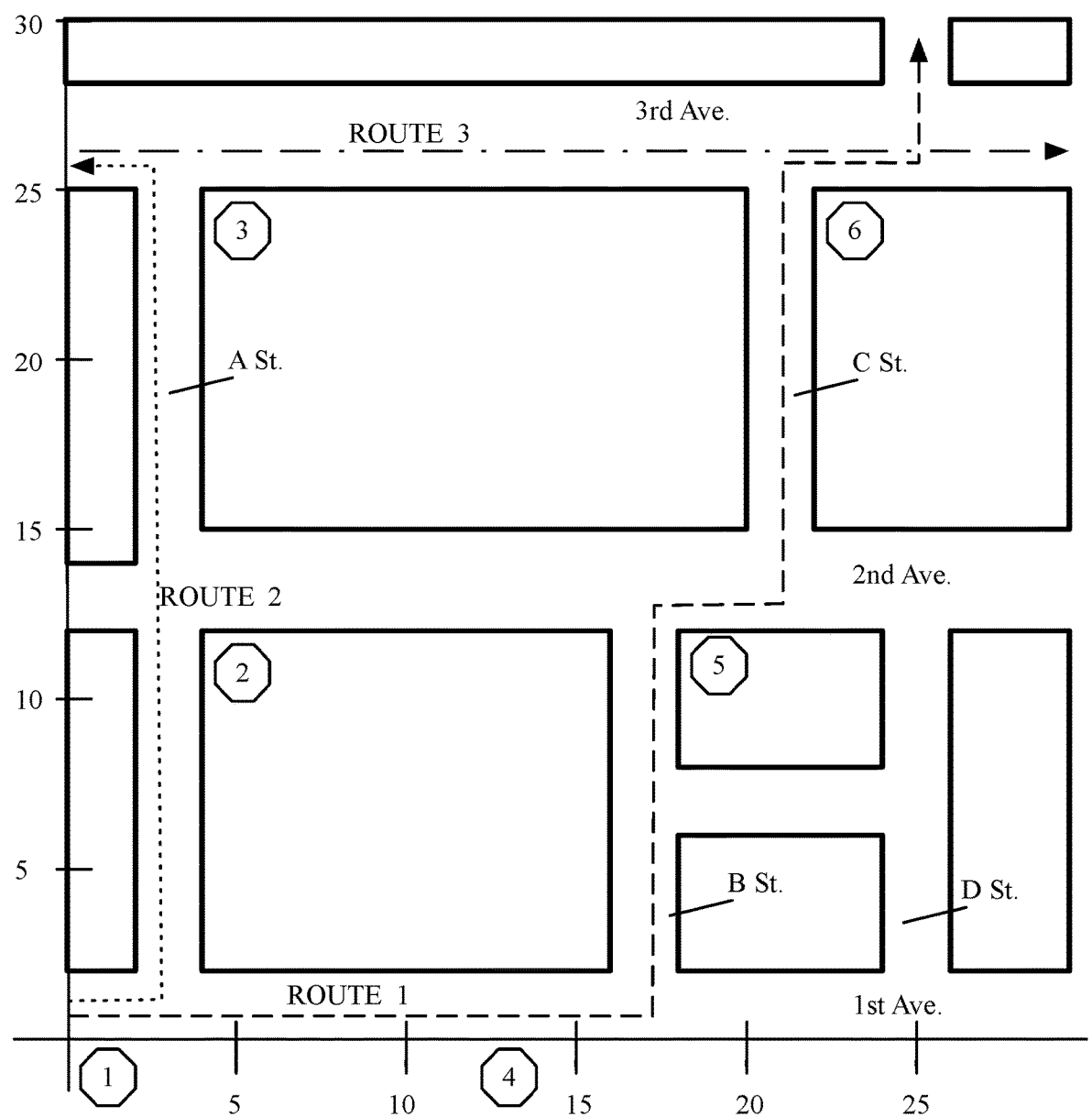
FIG. 3 is a route map, in accordance with certain example embodiments.

Referring to FIG. 3, and continuing to refer to prior figures for context, a scheduled route map 300 for three buses that are passenger transit vehicles (PTVs), PTV A (ROUTE 1), PTV B (ROUTE 2), and PTV C (ROUTE 3), is shown in accordance with certain example embodiments of the technology disclosed herein. In a continuing example, PTV A and PTV B start at the origin {0, 0} at time t0 (in the continuing example, "tX" refers to time="X," where each time interval is equal), while PTV C starts at {0, 26} at time t26. Each bus contains a transit terminal 120. The buses stop each transit stop (indicated by a numbered octagon) on each bus's respective route. Interactions between the transit terminals 120 and user computing devices 110 are shown in TABLE 1.

The transit vehicle location server 150, detects four user geolocation-enabled mobile telephones, user computing devices 110-1 through 110-4, as interacting with transit terminal 120 #1 (TT1) at or near time t0 over communications network 99. The transit vehicle location server 150 detects two user geolocation-enabled mobile telephones, user computing device 110-5 and user computing device 110-6, as interacting with transit terminal 120 TT2 at or near time t0. The transit vehicle location server 150 detects user geolocation-enabled mobile telephone, user computing device 110-7, as interacting with transit terminal 120 TT2 at or near time t16. The transit vehicle location server 150 detects two user geolocation-enabled mobile telephones, user computing devices 110-12 through 110-13, as interacting with transit terminal 120 TT3 at or near time t26. The transit vehicle location server 150 detects three additional user geolocation-enabled mobile telephones, user computing devices 110-9 through 110-11, as interacting with transit terminal 120 TT1 at or near time t30. The transit vehicle location server 150, detects two user geolocation-enabled mobile telephones, user computing device 110-14 through user computing device 110-15, as interacting with transit terminal 120 TT1; three user geolocation-enabled mobile telephones, user computing device 110-1, user computing device 110-16, and user computing device 110-3 as interacting with transit terminal 120 TT3; and one user geolocation-enabled mobile telephone, user computing device 110-2, as interacting with transit terminal 120 TT4—all at or near time t48.

While the continuing example describes interaction between transit terminals 120 and user computing devices 110 (e.g., geolocation-enabled mobile phones), other user devices capable of geolocation, for example, geolocation-enabled tablet computers and geolocation-enabled payment bracelets, can be used. Common characteristics of such user computing devices 110 include the capability to engage in an interaction with a transit terminal 120 detectable via a communications network 99, such as the Internet, and the capability to perform geolocation.

While the continuing example describes interaction between the public transit terminals 120 and the user computing devices 110 as via an NFC communication channel, other communication channels, for example, BLUETOOTH™ wireless communication, Wi-Fi™ wireless local area networking, infrared communication, wireless infrared communication, and other personal area networks (PANs) can be used between a user computing device 110 and a transit terminal 120. An optical communications channel (for example, bar code scanning) or audio-frequency communications channel, or magnetic swiping can be used, as long as the transaction can be detected via a communications network 99 (such as the Internet), and the user computing device 110 can perform and report on geolocation. In the continuing example, each interaction other than the interaction of index #19 is an embarkation fare interaction. Interaction index #19 is a fare account purchase interaction. In some embodiments, one or more of the interactions can be an informational interaction, such as between the user computing device 110 an information terminal or an advertisement on a transit vehicle. In some embodiments, one or more of the interactions can be a debarkation interaction, or a mix of any of the aforementioned interactions. In some embodiments, the transit terminals 120 can be radio frequency identification (RFID) interrogators.

TABLE 1

| Index | Interacting Transit Terminals 120 | Interacting User Computing Devices 110 | Interaction Time |
|---|---|---|---|
| 1 | TT1 | 110-1 | t0 |
| 2 | TT1 | 110-2 | t1 |
| 3 | TT1 | 110-3 | t4 |
| 4 | TT1 | 110-4 | t1 |
| 5 | TT2 | 110-5 | t0 |

TABLE 1-continued

| Index | Interacting Transit Terminals 120 | Interacting User Computing Devices 110 | Interaction Time |
|---|---|---|---|
| 6 | TT2 | 110-6 | t0 |
| 7 | TT2 | 110-7 | t16 |
| 8 | TT2 | 110-8 | t17 |
| 9 | TT1 | 110-9 | t30 |
| 10 | TT1 | 110-10 | t30 |
| 11 | TT1 | 110-11 | t30 |
| 12 | TT3 | 110-12 | t26 |
| 13 | TT3 | 110-13 | t26 |
| 14 | TT1 | 110-14 | t48 |
| 15 | TT1 | 110-15 | t48 |
| 16 | TT3 | 110-1 | t48 |
| 17 | TT3 | 110-16 | t48 |
| 18 | TT3 | 110-3 | t48 |
| 19 | TT4 | 110-2 | t48 |

For each detected interaction, the one or more computing devices requests a geolocation of the corresponding user computing device 110 at the time of the interaction—Block 220. In the continuing example, the transit vehicle location server 150, in response to detecting each interaction between a transit terminal 120 and a user's mobile phone, user computing device 110, requests the geolocation of the mobile phone, user computing device 110, at the time of the transaction over communications network 99.

In some embodiments of the technology, each user computing device 110 automatically performs geolocation, that is, the "request" is internal to user computing device 110 upon detecting an interaction with a transit terminal 120, for example, as part of the payment processing for the user's fare. In some embodiments, the transaction is detected by any one of the public transit terminal 120, the payment processing system 140, or the transit server 130 (as in the continuing example), and a request is made to the user computing device 110 to determine its geolocation.

In response to a request for geolocation, the one or more computing devices receives from each corresponding user computing device 110, the geolocation of the corresponding user computing device 110, the time of the geolocation, and the data indicative of the interacting terminal—Block 230. In the continuing example, each interacting user computing device 110, at or near the time of its interaction with a transit terminal 120 determines its geolocation. The user computing device 110 can determine geolocation in any of a variety of ways, including using one or more of the Global Positioning System (GPS), one or more cell site signals (based on one or more of signal strength, time of arrival, and triangulation), and inertial navigation technologies.

In the continuing example, the transit vehicle location server 150 receives at least one geolocation from each of mobile phones, user computing devices 110-1 through 110-16 along with the time of the geolocation and the data indicative of the interacting transit terminal 120. In the continuing example, the time of the geolocation is the same as the time the interaction. TABLE 2 presents the geolocations (in the coordinates of FIG. 3 as the "geolocation") obtained from the mobile phones, user computing devices 110-1 through 110-16.

TABLE 2

| Index | Interacting Transit Terminals 120 | Interacting User Computing Devices 110 | Interaction Time | Geolocation |
|---|---|---|---|---|
| 1 | TT1 | 110-1 | t0 | 0, 0 |
| 2 | TT1 | 110-2 | t1 | 3, 7 |
| 3 | TT1 | 110-3 | t4 | 1, 2 |
| 4 | TT1 | 110-4 | t1 | 0, 1 |
| 5 | TT2 | 110-5 | t0 | 0, 0 |
| 6 | TT2 | 110-6 | t0 | 0, 0 |
| 7 | TT2 | 110-7 | t16 | 4, 12 |
| 8 | TT2 | 110-8 | t17 | 4, 12 |
| 9 | TT1 | 110-9 | t30 | 15, 12 |
| 10 | TT1 | 110-10 | t30 | 15, 12 |
| 11 | TT1 | 110-11 | t30 | 18, 12 |
| 12 | TT3 | 110-12 | t26 | 4, 26 |
| 13 | TT3 | 110-13 | t26 | 4, 26 |
| 14 | TT1 | 110-14 | t48 | 20, 24 |
| 15 | TT1 | 110-15 | t48 | 24, 24 |
| 16 | TT3 | 110-1 | t48 | 23, 26 |
| 17 | TT3 | 110-16 | t48 | 22, 27 |
| 18 | TT3 | 110-3 | t48 | 22, 26 |
| 19 | TT4 | 110-2 | t48 | 20, 24 |

The one or more computing devices geolocates a public transit vehicle associated with at least one interacting terminal based on the received user computing device 110 geolocations—Block 240. In the continuing example, transit terminal 120 #1 (TT1) is associated with PTV A, transit terminal 120 TT2 is associated with PTV B, transit terminal 120 TT3 is associated with PTV C, and transit terminal 120 TT4 is associated with a fixed transit terminal 120. Since each interaction in the continuing example is associated with an embarkation interaction, the passenger transit vehicle can be assigned the geolocation of a known transit stop at the latest time mode within a window having a threshold number of interactions. For reference, a "mode" is a value that appears most often in a set of data. A set of data can have more than one mode. A distance bound can be applied to exclude geolocations beyond a threshold distance from a transit stop.

In the continuing example, transit stops are located at Transit Stop #1 (TS1)={0, 0}, TS2={4, 12}, TS3={4, 26}, TS4={0, 13}, TS5={15, 12}, and TS6={23, 26} as shown in FIG. 3. The threshold number of interactions is two; the distance bound is two distance units in each direction from a known transit stop; and the time window is two time units.

Starting at time t0, a single embarkation interaction (index #1 involving transit terminal 120 TT1 and user computing device 110-1) is detected at location {0, 0}, and two embarkation interactions (index #5 involving transit terminal 120 TT2 and user computing device 110-5, index #6 involving transit terminal 120 TT2 and user computing device 110-6) are detected by transit vehicle location server 150 over communications network 99 at location {0, 0}. This data is sufficient to geolocate PTV B using transit vehicle location sever 150 at TS1 at t0 (the mode of the time of the detections) since two interactions within two distance units in each direction of a known transit stop were collected within a two time unit window. The data is not yet sufficient to geolocate PTV A at TS1 since only one detection was made for the transit terminal 120 TT1 near that location.

At t1, two detections (index #2 involving transit terminal 120 TT1 and user computing device 110-2, index #4 involving transit terminal 120 TT1 and user computing device 110-4) are made by transit vehicle location server 150—the first at location {3,7} and the second at location {0,1}. The index #2 {3, 7} location is outside the distance window, and therefore cannot be used. However, the index #4 location is inside the distance window, inside the time window, and provides the threshold number of detections for transit terminal 120 TT1. This allows transit vehicle location server 150 to geolocate PTV A at TS1 at t1 (the latest mode of the time of the detections used to locate PTV A in the relevant windows). At t4, an additional detection (index #3 involving transit terminal 120 TT1 and user computing device 110-3) is made by transit vehicle location server 150 at location {1, 2}. Since the index #3 detection is outside the time window (though inside the distance window), it will not be used.

The continuing example proceeds in the fashion described in the preceding paragraphs, locating PTV A at TS5 at t30 and at TS6 at time t48; locating PTV B at TS 2 at t17; and locating PTV C at TS6 at time t48. Note that while an interaction is detected between user computing device 110-2 and transit terminal 120 TT4 at time t48 within the distance boundaries of transit station TS6, transit terminal 120 TT4 is not associated with a passenger transit vehicle, so therefore the detection information associated with index #19 is not used in geolocating a passenger transit vehicle.

The location of at least one passenger transit vehicle is transmitted for display on one or more user computing devices 110—Block 250. In the continuing example, the TS1 location of PTV B at to is transmitted by transit vehicle location server 150 to a public transit map application executing on a group of user computing devices 110, including user computing devices 110-1 through 110-16. The TS1 location of PTV A at t1 is transmitted by transit vehicle location server 150 to the public transit map application executing on the group of user computing devices 110. The TS2 location of PTV B at t17 is transmitted by transit vehicle location server 150 to the public transit map application executing on the group of user computing devices 110. The TS3 location of PTV A at t30 is transmitted by transit vehicle location server 150 to the public transit map application executing on the group of user computing devices 110. The TS3 location of PTV C at t26 is transmitted by transit vehicle location server 150 to the public transit map application executing on the group of user computing devices 110. The TS6 location of PTV A and PTV C at t48 is transmitted by transit vehicle location server 150 to the public transit map application executing on the group of user computing devices 110.

Other methods can be used for geolocation. For example, time and distance thresholds can be relaxed or tightened from those described in the continuing embodiment. Referring to FIG. 4, and continuing to refer to previous figures for context, methods 400 for geolocating a transit vehicle associated with at least one interacting terminal based on the received user device geolocations are shown, in accordance with example embodiments of the disclosed technology. In such methods, Blocks 210-230 and Block 250 are performed as described elsewhere herein.

In such methods, a route of a passenger transit vehicle associated with an interacting terminal is received—Block 410. In the continuing example, as shown in FIG. 3, the route of PTV B is received passing east along $1^{st}$ Avenue from Stop #1, to Stop #2, then north on B Street to Stop #3, right on $2^{nd}$ Avenue, then left on C Street to Stop #4, then right on $3^{rd}$ Avenue, and left on D. Street. For simplicity, PTV B drives in the middle of the road.

In such embodiments, geolocating further comprises assigning a geolocation of the passenger transit vehicle for which a route is received at a point that minimizes the distance between the centroid of the user device geolocations associated with the interacting terminal received within a predetermined time window, and the route received for the passenger transit vehicle associated with the interacting terminal—Block 440. In the continuing example, within a time window of two time units from t48, two interactions were received by transit vehicle location server 150 for interactions between two separate user devices (user computing device 110-14, user computing device 110-15) and transit terminal 120 TT1. The location for the interaction between transit terminal 120 TT1 and user computing device 110-14 is {20, 24}, and the location for the interaction between transit terminal 120 TT1 and user computing device 110-15 is {24, 24}. The centroid of those user computing device 110 geolocations is {22, 24}. By inspection, the point along PTV B's route closest to {22, 24} is {21, 24}. Therefore, transit vehicle location server 150 assigns {21, 24} as the geolocation of PTV B at t48.

Other Example Embodiments

FIG. 6 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PO"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

The invention claimed is:

1. A computer-implemented method to locate passenger transit vehicles, comprising:
   detecting, by one or more processors, each of a plurality of interactions, each interaction between one of a plurality of transit terminals and one of a plurality of user devices, each interaction characterized by data indicative of an interacting terminal and a time of interaction;
   for each detected interaction, receiving, by the one or more processors from each corresponding user device, a respective geolocation of the corresponding user device, a time of the respective geolocation, and data indicative of the respective interacting terminal;
   geolocating, by the one or more processors a passenger transit vehicle associated with the respective interacting terminal based on the respective geolocation of the corresponding user device and the time of the respective geolocation corresponding to interaction involving the respective interacting terminal; and transmitting, by the one or more processors, to one or more computing devices the geolocation of the geolocated passenger transit vehicle.

2. The computer-implemented method of claim 1, wherein the geolocating of the passenger transit vehicle comprises:
selecting a transit station closest to the respective geolocation of the corresponding user device;
choosing the passenger transit vehicle corresponding to a route having a stop at the selected transit station closest in time to the received time of the respective geolocation of the corresponding user device; and
geolocating the chosen passenger transit vehicle at the selected transit station at a time as a function of the time of the respective geolocation of the corresponding user device.

3. The computer-implemented method of claim 2, wherein the transit station is selected after receiving a predetermined threshold number of geolocations from different respective user devices closest to the transit station.

4. The computer-implemented method of claim 2, wherein the transit station is selected for a respective geolocation within a threshold distance of the transit station.

5. The computer-implemented method of claim 1, wherein the respective interaction is one of an embarkation interaction or a debarkation interaction.

6. The computer-implemented method of claim 1, further comprising:
requesting, by the respective interacting terminal in response to the detecting, the respective geolocation of the corresponding user device.

7. The computer-implemented method of claim 1, further comprising:
receiving, by the one or more processors, a route of the passenger transit vehicle associated with the respective interacting terminal; and
wherein the geolocating further comprises assigning the geolocation of the passenger transit vehicle for which the route is at a point that minimizes a distance between:
a centroid of respective geolocations from different user devices associated with the respective interacting terminal received within a predetermined time window, and
the route for the passenger transit vehicle associated with the respective interacting terminal.

8. A non-transitory computer-readable medium having computer-executable program instructions embodied thereon that, when executed by one or more processors, cause the one or more processors to:
detect each of a plurality of interactions, each interaction between one of a plurality of public transit terminals and one of a plurality of user devices, each interaction characterized by data indicative of an interacting terminal, an interacting user device, and a time of interaction;
for each detected interaction, receive, from each corresponding user device, a respective geolocation of the corresponding user device, a time of the respective geolocation, and data indicative of the respective interacting terminal;
geolocate, in response to the receiving, a public transit vehicle associated with the respective interacting terminal based on the respective geolocation of corresponding user devices; and
transmit, to one or more computing devices, the geolocation of the geolocated public transit vehicle.

9. The non-transitory computer-readable medium of claim 8, wherein the one or more processors further:
select a transit station closest to the respective geolocation of the corresponding user device;
choose the public transit vehicle corresponding to a route having a stop at the selected transit station closest in time to the received time of the respective geolocation of the corresponding user device; and
geolocate the chosen public transit vehicle at the selected transit station at a time as a function of the time of the respective geolocation of the corresponding user devices.

10. The non-transitory computer-readable medium of claim 9, wherein the transit station is selected after receiving a predetermined threshold number of geolocations from different respective user devices closest to the transit station.

11. The non-transitory computer-readable medium of claim 9, wherein the transit station is selected for a respective geolocation within a threshold distance of the transit station.

12. The non-transitory computer-readable medium of claim 8, wherein the interaction is one of an embarkation interaction or a debarkation interaction.

13. The non-transitory computer-readable medium of claim 8, wherein the one or more processors further:
request the respective geolocation from the corresponding user device in response to detecting interaction with the respective interacting terminal.

14. The non-transitory computer-readable medium of claim 8, wherein the one or more processors further:
receive a route of each of a plurality of public transit vehicles; and
wherein the geolocating further comprises assigning the geolocation of the public transit vehicle at a point that minimizes a distance between:
a centroid of respective geolocations from different user devices associated with the interacting terminal received within a predetermined time window, and
the route received for the public transit vehicle associated with the respective interacting terminal.

15. A system to locate public transit vehicles, the system comprising:
a storage device; and
one or more processors communicatively coupled to the storage device, wherein the one or more processors execute instructions from the storage device that cause the system to:
detect each of a plurality of interactions, each interaction between one of a plurality of public transit terminals and one of a plurality of user devices, each interaction characterized by data indicative of an interacting terminal, an interacting user device, and a time of interaction;
for each detected interaction, receive, from each corresponding user device, a respective geolocation of the corresponding user device, a time of the respective geolocation, and data indicative of the respective interacting terminal;
geolocate, in response to the receiving, a public transit vehicle associated with at least one interacting terminal based on the respective geolocation of the corresponding user devices; and
transmit, for display on one or more user devices, the respective geolocation of the geolocated public transit vehicle.

16. The system of claim 15, wherein to geolocate the public transit vehicle, the system further is to:
- select a transit station closest to the respective geolocation of the corresponding user device;
- choose the public transit vehicle corresponding to a route having a stop at the selected transit station closest in time to the received time of the respective geolocation of the corresponding user device; and
- geolocate the chosen public transit vehicle at the selected transit station at a time as a function of the time of the respective geolocation of the corresponding user devices.

17. The system of claim 16, wherein the transit station is selected after receiving a predetermined threshold number of geolocations from different respective user devices closest to the transit station.

18. The system of claim 16, wherein the transit station is selected for a respective geolocation within a threshold distance of the transit station.

19. The system of claim 15, wherein the interaction is one of an embarkation interaction or a debarkation interaction.

20. The system of claim 15, wherein the system further is to:
- receive a respective route of each of a plurality of public transit vehicles; and
- wherein the geolocating of the public transit vehicle further comprises assigning a geolocation of the public transit vehicle at a point that minimizes a distance between:
  - a centroid of respective geolocations from different user devices associated with the interacting terminal received within a predetermined time window, and
  - the respective route received for the transit vehicle associated with the interacting terminal.

\* \* \* \* \*